(12) United States Patent
Pineda (10) Patent No.: US 12,090,400 B2
(45) Date of Patent: Sep. 17, 2024

(54) ANTI-PEEK SYSTEM FOR VIDEO GAMES

(71) Applicant: Electronic Arts Inc., Redwood City, CA (US)

(72) Inventor: Carlos Emmanuel Reyes Pineda, Sherman Oaks, CA (US)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 18/174,308

(22) Filed: Feb. 24, 2023

(65) Prior Publication Data

US 2023/0277930 A1 Sep. 7, 2023

Related U.S. Application Data

(63) Continuation of application No. 17/549,776, filed on Dec. 13, 2021, now Pat. No. 11,623,145.

(51) Int. Cl.
*A63F 13/52* (2014.01)
*A63F 13/75* (2014.01)

(52) U.S. Cl.
CPC ............. *A63F 13/52* (2014.09); *A63F 13/75* (2014.09)

(58) Field of Classification Search
CPC ................................ A63F 13/52; A63F 13/75
See application file for complete search history.

(56) References Cited

U.S. PATENT DOCUMENTS

| | | | |
|---|---|---|---|
| 6,155,926 A | 12/2000 | Miyamoto | |
| 7,470,195 B1 | 12/2008 | Baldwin, III | |
| 7,789,741 B1 | 9/2010 | Fields | |
| 8,259,112 B2 | 9/2012 | Kuroda | |
| 8,342,926 B2 | 1/2013 | Garvin | |
| 8,834,245 B2 | 9/2014 | Haigh-Hutchinson | |
| 9,086,724 B2 | 7/2015 | Sakaguchi | |
| 9,327,191 B2 | 5/2016 | Miyamoto | |
| 9,421,461 B2 | 8/2016 | Edsall | |
| 2004/0224760 A1 | 11/2004 | Miyamoto | |
| 2007/0298881 A1 | 12/2007 | Kawamura | |
| 2010/0009734 A1* | 1/2010 | Sambongi | A63F 13/422 463/5 |
| 2011/0136571 A1 | 6/2011 | Ito | |
| 2011/0245942 A1 | 10/2011 | Yamamoto | |
| 2013/0109473 A1 | 5/2013 | Yamashita | |
| 2014/0002456 A1 | 1/2014 | Mizuki | |
| 2014/0024452 A1 | 1/2014 | Fujisawa | |

\* cited by examiner

*Primary Examiner* — Reginald A Renwick
(74) *Attorney, Agent, or Firm* — McDermott Will & Emery LLP (57) ABSTRACT

Various aspects of the subject technology relate to systems, methods, and machine-readable media for preventing rendering of a character in a video game. The method includes receiving an action regarding a first character rendered in a first-person point of view (POV), the action causing the POV of the first character to change from the first-person POV to a third-person POV. The method includes detecting the POV of the first character is to be changed. The method includes determining characters are outside of a field of view (FOV) of the first character in the first-person POV and would be within the FOV of the first character in the third-person POV. The method includes changing the POV of the first character from the first-person POV to a third person POV. The method includes causing rendering of the video game in a third-person POV of the first character, the rendering preventing rendering of other characters.

20 Claims, 8 Drawing Sheets

ANTI-PEEK SYSTEM FOR VIDEO GAMES

CROSS REFERENCE TO RELATED APPLICATIONS

This present application claims the benefit of priority under 35 U.S.C. 120 as a continuation of U.S. patent application Ser. No. 17/549,776, filed Dec. 13, 2021, now allowed, the disclosure of which is hereby incorporated by reference in its entirety for all purposes.

BACKGROUND

Video games provide an engaging way to play, cooperate, and compete with others in a virtual interactive environment. First-person point of view (POV) shooters, commonly known as "First Person Shooters" or "FPS," are a popular game genre where players can play cooperatively and competitively in a variety of game modes. With the growth and rise of esports, competitive gaming in the FPS genre is gaining popularity. Due to the competitive nature of these types of video games, some players may attempt to gain an unfair advantage by exploiting in-game features that were not intended for exploitation.

BRIEF SUMMARY

According to one embodiment of the present disclosure, a computer-implemented method to prevent rendering of a video game character in a video game is provided. The method includes receiving an action corresponding to a first character being rendered in a first-person point of view (POV), the action being of a type that causes the POV of the first character to change from the first-person POV to a third-person POV. The method includes detecting that the POV of the first character is to be changed from the first-person POV to a third-person POV based at least in part on the received action. The method includes determining one or more other characters that are outside of a field of view (FOV) of the first character in the first-person POV and would be within the FOV of the first character in the third-person POV. The method includes changing the POV of the first character from the first-person POV to a third person POV. The method includes causing rendering of the video game in a third-person POV of the first character, the rendering preventing rendering of the one or more other characters based on the determining.

According to one embodiment of the present disclosure, a system is provided including a processor and a memory comprising instructions stored thereon, which when executed by the processor, causes the processor to perform a method to prevent rendering of a video game character in a video game. The method includes receiving an action corresponding to a first character being rendered in a first-person point of view (POV), the action being of a type that causes the POV of the first character to change from the first-person POV to a third-person POV. The method includes detecting that the POV of the first character is to be changed from the first-person POV to a third-person POV based at least in part on the received action. The method includes determining one or more other characters that are outside of a field of view (FOV) of the first character in the first-person POV and would be within the FOV of the first character in the third-person POV. The method includes changing the POV of the first character from the first-person POV to a third person POV. The method includes causing rendering of the video game in a third-person POV of the first character, the rendering preventing rendering of the one or more other characters based on the determining.

According to one embodiment of the present disclosure, a non-transitory computer-readable storage medium is provided including instructions (e.g., stored sequences of instructions) that, when executed by a processor, cause the processor to perform a method to prevent rendering of a video game character in a video game. The method includes receiving an action corresponding to a first character being rendered in a first-person point of view (POV), the action being of a type that causes the POV of the first character to change from the first-person POV to a third-person POV. The method includes detecting that the POV of the first character is to be changed from the first-person POV to a third-person POV based at least in part on the received action. The method includes determining one or more other characters that are outside of a field of view (FOV) of the first character in the first-person POV and would be within the FOV of the first character in the third-person POV. The method includes changing the POV of the first character from the first-person POV to a third person POV. The method includes causing rendering of the video game in a third-person POV of the first character, the rendering preventing rendering of the one or more other characters based on the determining.

According to one embodiment of the present disclosure, a system is provided that includes means for storing instructions, and means for executing the stored instructions that, when executed by the means, cause the means to perform a method to prevent rendering of a video game character in a video game. The method includes receiving an action corresponding to a first character being rendered in a first-person point of view (POV), the action being of a type that causes the POV of the first character to change from the first-person POV to a third-person POV. The method includes detecting that the POV of the first character is to be changed from the first-person POV to a third-person POV based at least in part on the received action. The method includes determining one or more other characters that are outside of a field of view (FOV) of the first character in the first-person POV and would be within the FOV of the first character in the third-person POV. The method includes changing the POV of the first character from the first-person POV to a third person POV. The method includes causing rendering of the video game in a third-person POV of the first character, the rendering preventing rendering of the one or more other characters based on the determining.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The subject disclosure provides for systems and methods of an "anti-peek" feature for preventing rendering exploits in a first-person POV multiplayer game. The anti-peek feature aims to maintain or increase the fairness and competitive integrity of online multiplayer first-person POV video games that include actions that temporarily transition or change the camera view to third person POV.

In an aspect, some player characters or portions thereof—other than the player's character—are prevented from being rendered when those characters are not visible from within a field-of-view (FOV) corresponding to a first-person POV of a player's character. For example, a character other than that player's character (e.g., an opponent character corresponding to an opponent player or a non-player character (NPC)) that would be visible (e.g., rendered or displayed) from within the FOV corresponding to a third-person POV may not be rendered if that other character is not within the FOV of a first-person POV of the player's character when an action causes a camera view or perspective to change (e.g., from first-person to third-person). In this way, the other character and/or the other player corresponding to the other character may not become unfairly visible when the perspective changes.

A first-person multiplayer video game can include actions that cause the camera perspective to temporarily switch to a third-person view. For example, a game action can include an animation that causes the camera perspective of one or more players to switch from first-person to third-person view for the duration of the animation (e.g., duration of the action).

This is the case, for example, when a player has their character (e.g., a player controlled-character) perform an emote near an object that provides their character cover from—or to remain unseen by—another player-controlled character and/or another player. Players may be able to misuse or exploit this game mechanic to peek around corners and see game action, opponents, or objects without exposing their characters. This provides those players with an unfair visual advantage that is a significant problem, particularly in competitive play. Therefore, it is desirable to prevent exploitation of such in-game actions for an unfair advantage.

According to aspects, an anti-peek feature may be triggered whenever, in a first-person game, a game action causes a camera view or perspective to switch to third-person from first-person. For example, the game action may include an animation that causes the camera view to switch from first-person POV to third-person POV. In an example implementation, the game action by a character may include an emote, gesture, and/or other animation performed by a player's character, and so the camera may switch views so that the player may see their own character perform the game action in a third-person POV.

The anti-peek feature may also be utilized for other game actions that cause a temporary camera view change involving the characters of two or more players such as, including, but not limited to, finishers, reviving teammates, deploying/redeploying, flying, respawning, and other similar actions known to those of skill in the art that are typically displayed in third-person perspective modern video games.

According to some embodiments, an action causing a change in camera view may include the actions of a second player and/or character, such as a teammate or opponent player and/or character. In an example implementation, an act (e.g., action) of a second player and/or character may cause a first player and/or character to enter a third person perspective view. Some examples where the actions or interactions of/with a second player and/or character cause a first player and/or character to enter a third person perspective view include instances when a first character is knocked down and is revived directly by a teammate (e.g., both players and/or characters go into a third person view), when a first player is knocked down and is revived indirectly by teammate (e.g., the reviving first player goes into a third person view), and when a first character is knocked down and an enemy player performs a finisher. In an aspect, a finishing elimination move may cause the knocked down character to be eliminated from gameplay, and both players and/or characters may go into a third person view (e.g., the inverse of this situation applies as well).

In some embodiments, some actions by one player and/or character causing the camera view to change for another player and/or character can be configured such that both character models are rendered even if one of the characters is outside of the FOV of the first-person POV of another. For example, if one character sneaks up or approaches another character from behind to perform a stealth elimination, the game or anti-peek feature can be configured to allow both players and/or characters to perceive one another in that instance since neither player and/or character would gain an unfair advantage. As such, some actions that cause camera perspective changes for one or more players and/or characters that do not provide an unfair advantage need not be configured with, or associated to, an anti-peek feature.

Characters, or player characters, of a video game can refer to controllable character models configured to facilitate or perform gameplay actions or commands. Non-player characters (NPCs) can refer to character models that are not controlled by a player. In some embodiments, NPCs can be allies and/or opponents (e.g., enemies) to one or more players or player characters.

Player objects of a gameplay session(s) can refer to controllable objects, or models, used to facilitate or enable gameplay or other in-game actions. Player objects may be, for example, vehicles, vessels, aircraft, ships, tiles, cards, dice, pawns, and other in-game items of the like known to those of skill in the art.

For simplicity, player characters and player objects are collectively referred to herein as player characters in some embodiments. It should be understood that, as used herein, "controllable" refers to the characteristic of being able and/or configured to be controlled, instructed, and/or directed (e.g., moved, modified, and the like.) such as by a player or user.

It should be understood that as described in the present disclosure, a "user" on or of a computing device playing a video game refers to or is synonymous with a "player" or "opponent" of a video game. In some embodiments, a "player" and "opponent" are separate users that are competing against one another in a video game.

A point-of-view (POV) refers to a perspective or line-of-sight, such as from a given camera or character. A field-of-view (FOV) refers and/or corresponds to a viewing angle for a POV. As such, each POV has at least one corresponding FOV. In some embodiments, multiple POVs and FOVs can be configured for use or reference in a video game. For simplicity, the terms POV and FOV can be used interchangeably to mean a character or object is within a view, perspective, or line of sight.

The "character eye" of a player's character can refer to the POV of a character. The FOV corresponding to the character eye can correspond to the "player field-of-view (FOV)" set by a player within a game's settings, in some embodiments. For example, if a game includes an FOV option within the options or settings of the game, the character eye can be configured to match the FOV set by the player, such that the anti-peek feature corresponds with the set FOV. In some embodiments, the FOV of the character eye can be different and/or separate from the FOV used by the camera or perspective to render the game to a player.

A "camera" refers to a game object that provides a POV to render to display. In some embodiments, multiple cameras can be utilized by a video for providing, switching, or changing perspectives. In some embodiments, a camera is a standalone game object, such that it does not require being associated with another game object to function. In some embodiments, a camera can be associated with another game object. In some embodiments, a game object can also be a type of camera.

For example, the character eye can be associated with, include, or be a type of camera in some embodiments. As such, the character eye and the camera providing a player with a first-person POV can be separate game objects, or the same game object, in some embodiments.

As such, the disclosed system addresses a problem in traditional video games tied to computer technology, namely, the technical problem of preventing unfair utilization of in-game mechanics to gain an unfair advantage against other players. The disclosed system solves this technical problem by providing a solution also rooted in computer technology, namely, by providing a technique for preventing exploits associated with the rendering of a video game opponent character (e.g., an opponent-controlled character). The disclosed system also improves the functioning of the computer itself because it reduces the cost of system resources, such as for rendering of characters other than a primary player's character.

In the description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Figure 1A:
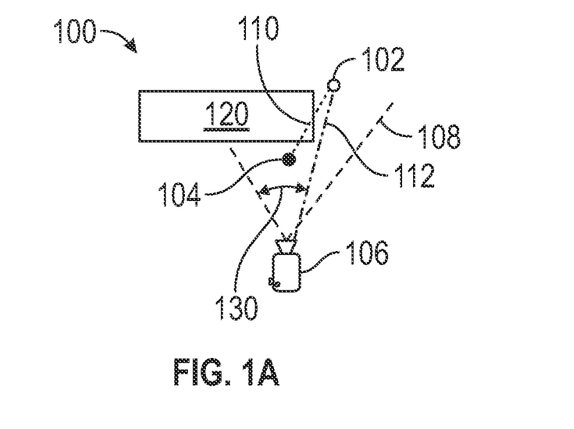
FIG. 1A illustrates an exemplary diagram for preventing rendering of a video game character in a video game, according to certain aspects of the present disclosure.

FIG. 1A illustrates an exemplary overhead view diagram 100 for preventing rendering of a video game opponent 102, according to certain aspects of the present disclosure. As illustrated, the opponent-controlled character 102 (e.g., the opponent) and a player-controlled character 104 (e.g., the player) may be engaged in a video game match. For example, the video game may be a first-person POV video game, such as a first-person shooter, and the opponent 102 may be controlled by a second player that is different from a first player controlling the player 104. The opponent 102 and the player 104 may each be positioned proximate to a barrier 120. For example, the barrier 120 may include an in-game environmental feature, such as a wall, a rock, a bush, a tree, a door, a corner, a building, or any other object/impediment that may obscure the presence of another character.

According to aspects, the opponent 102 may be hiding/positioned behind the barrier 120 such that the player 104 cannot see the opponent 102 from the first-person POV of the video game. In order to come into view of each other, either of the opponent 102 and/or the player 104 would need to move such that a line of sight 110 does not intersect with any portion of the barrier 120. For example, the line of sight 110 may represent a front view of what the player 104 may see in front of them. According to aspects, the front view of the player 104 may include a front field of view (FOV), such that the front FOV includes a view span of 180 degrees or less in front of the player 104. For example, the front view may include what is directly in front of the player 104 (e.g., a scope of a weapon, a crosshair, a centered dot, among other things of the like), and the front FOV may include a peripheral view of up to 180 degrees. In some embodiments, the front FOV of the player 104 corresponds to the camera perspective or camera view rendered to display.

According to aspects, the player 104 may perform a game action that may cause a camera 106 to switch from the first-person POV to a third-person POV. For example, the emote may include, but is not limited to, a gesture, a dance, a movement, or other animation of the like, that is performed by the player's character 104. During performance of the emote, the camera 106 may switch views so that the player 104 may see their own gesture from the third-person POV.

As illustrated in FIG. 1A, if the opponent 102 and the player 104 are positioned proximate to the barrier 120 in such a way that when the camera 106 pulls out to capture an in-game action (e.g., an emote), there may be situations where the player 104 may be able to see the opponent 102, even though the opponent 102 is not within the line of sight 110 of the player 104. In order to prevent the player 104 from unfairly peeking around the barrier 120 in this manner, an anti-peek feature may be triggered to prevent rendering of the opponent 102 in such situations.

According to aspects, a comparison between the line of sight 110 of the player 104 and a camera line of sight 112 may be performed to determine whether to render the opponent 102. For example, in FIG. 1A, the opponent 102 is not within the line of sight 110 of the player 104. However, the opponent 102 would be within the camera line of sight 112 if the player 104 performs an emote. Therefore, in order to prevent unfair peeking around the barrier 120 by the player 104, the anti-peek feature may disable/prevent rendering of the opponent 102 while the emote is being performed. In this way, the opponent 102 would remain hidden from the player 104 and prevent the player 104 from exploiting the in-game action of the emote to peek around the barrier 120.

In an implementation, the camera line of sight 112 may be anywhere within a camera FOV 108 (e.g., a third-person FOV). In some embodiments, camera FOV 108 supports a variety of viewing angles. For example, the camera FOV 108 may also include an FOV span 130 of 180 degrees or less.

Figure 1B:
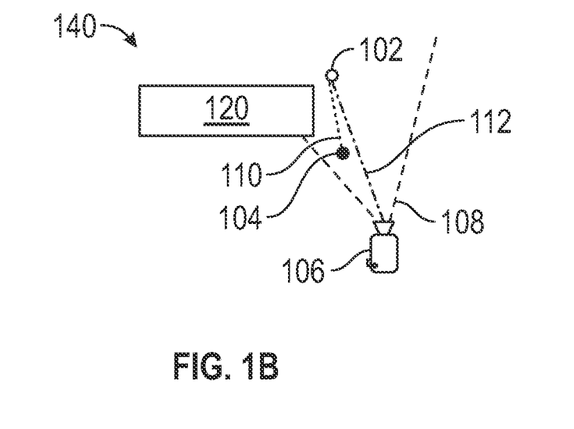
FIG. 1B illustrates an exemplary diagram for preventing rendering of a video game character in a video game, according to certain aspects of the present disclosure.

FIG. 1B illustrates another exemplary overhead view diagram 140 for preventing rendering of a video game opponent 102, according to certain aspects of the present disclosure. As illustrated, the player 104 has moved and/or is in a position such that the line of sight 110 does not intersect any portion of the barrier 120. In this scenario, the opponent 102 will be rendered in situations where the camera 106 pulls out to a third-person POV. This is because the opponent 102 is already in view of the player 104, and so there would not be any unfair advantage gained by rendering the opponent 102.

Figure 1C:
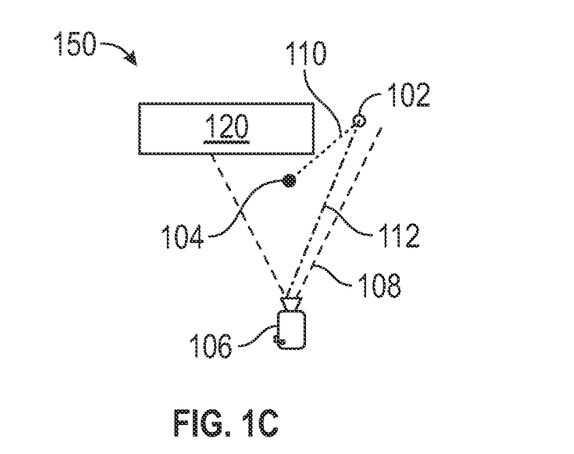
FIG. 1C illustrates an exemplary diagram for preventing rendering of a video game character in a video game, according to certain aspects of the present disclosure.

FIG. 1C illustrates another exemplary overhead view diagram 150 for preventing rendering of a video game opponent 102, according to certain aspects of the present disclosure. As illustrated, the opponent 102 has moved and/or is in a position such that the line of sight 110 does not intersect any portion of the barrier 120. In this scenario, the opponent 102 will be rendered in situations where the camera 106 pulls out to a third-person POV. This is because the opponent 102 is already in view of the player 104, and so there would not be any unfair advantage gained by rendering the opponent 102.

According to aspects, each of the opponent 102 and/or the player 104 may be in constant motion in relation to each other and/or the barrier 120, as illustrated in FIGS. 1A-1C. In situations where, for example, the opponent 102 and/or the player 104 move back and forth from their respective positions as illustrated in FIG. 1A to FIG. 1C, and then back from FIG. 1C to FIG. 1A, the anti-peek system may trigger on an off depending on whether the opponent 102 is within the line of sight 110 of the player 104. As a result, the opponent 104 may alternate between becoming rendered and/or being prevented from being rendered depending on how the opponent 102 and the player 104 may constantly move in relation to each other.

According to aspects, the anti-peek feature may function by distinguishing between a character eye (e.g., the line of sight 110) and a camera eye (e.g., the camera line of sight 112 that is within the camera FOV 108). When the anti-peek feature is triggered, any other characters within the field of view of the camera eye are identified, which at that point has been toggled to third-person, and adds those other characters to a list for evaluation. In turn, multiple traces may be performed from the character eye to different body parts (e.g., chest, head, forearm, among other things of the like) of each of the other characters on the evaluation list. If all the traces to one of the other characters on the list fail, meaning that each of their body parts are not visible from the character eye, that other character is not rendered. Otherwise, they are rendered. In an implementation, the traces may be taken from each body part of each character.

According to aspects, the rendering determination may also be performed for individual body parts rather than an entire character. For example, the anti-peek feature may also cause any other characters to be added to the list that are at least partially visible from the third-person view. Traces from the character eye to different body parts of each of the other characters on the list may be performed, and body parts that are not visible from the character eye may be flagged so that they are not rendered.

According to aspects, the anti-peek feature may also be utilized to prevent rendering of things that are indicative of other characters' presence, such as their shadows, surveillance drones, portals, traps, among other things of the like. If these are visible from the third-person view but would not otherwise be visible by a character from their first-person view, they are not shown/rendered so as to prevent an unfair advantage.

According to additional aspects, the anti-peek feature may also be utilized/triggered for other game actions that may cause a temporary camera view change such as, including, but not limited to, finishers, reviving teammates, deploying/redeploying, flying, among other things of the like.

In an implementation, the anti-peek feature may be automatically turned on or off by the video game system during certain periods of time in gameplay. For example, the anti-peek feature may be turned off before a match begins (e.g., during pregame) and/or after a match is over.

According to an aspect, when the anti-peek feature is triggered, the line of sight 110 may become hard locked so that even if player 104 moves, the player 104 still will not see the opponent. According to an aspect, the anti-peek feature may apply to all other characters, including allies, and not just opponents.

It is understood that when used with reference to game characters (e.g., player-controlled characters), "seeing" is intended to indicate what is unobstructed from a character's FOV.

Figure 2A:
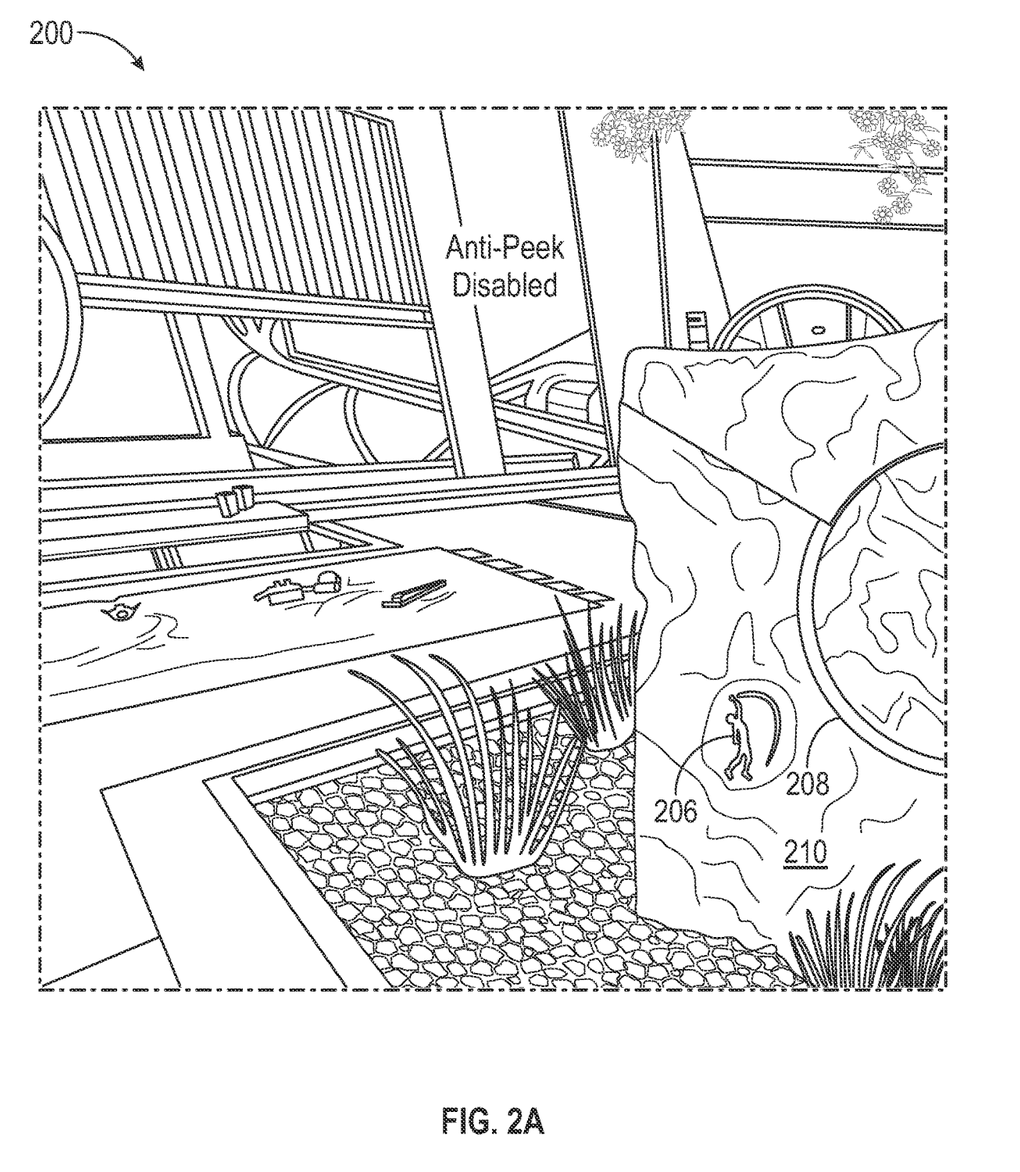
FIG. 2A illustrates an exemplary first-person point of view (POV) when an anti-peek system is disabled, according to certain aspects of the present disclosure.

FIG. 2A illustrates an exemplary first-person point of view (POV) 200 when an anti-peek system is disabled, according to certain aspects of the present disclosure. As illustrated, from the first-person POV, a barrier 210 obstructs a player's view of what is behind the barrier 210. The player may choose to perform an emote 206 (e.g., an uppercut gesture, or otherwise), which may be selected from an in-game menu 208. As will be illustrated below in FIG. 2B, the POV changes from first-person to third-person when the player performs the emote 206.

Figure 2B:
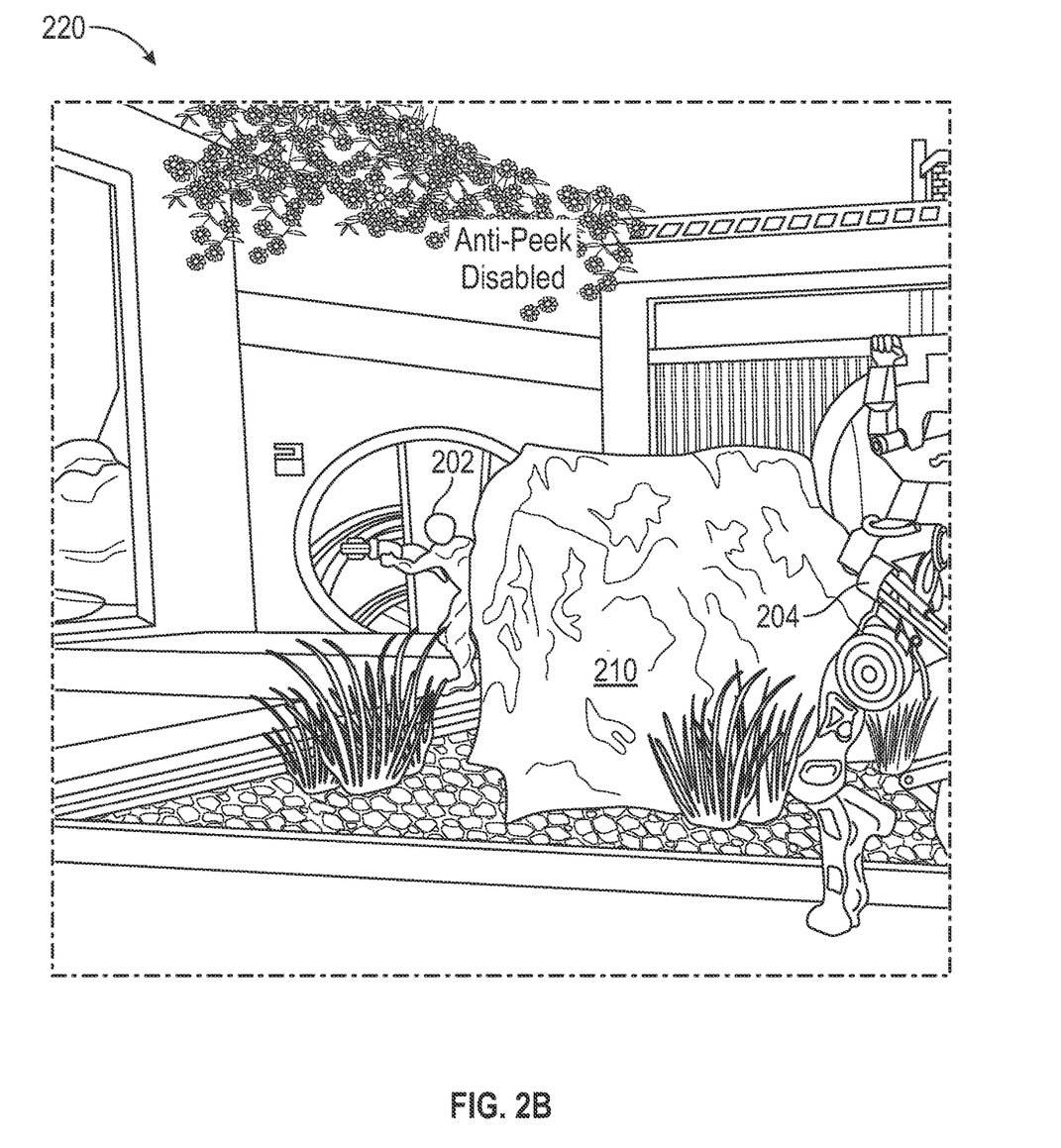
FIG. 2B illustrates an exemplary third-person point of view (POV) when an anti-peek system is disabled, according to certain aspects of the present disclosure.

FIG. 2B illustrates an exemplary third-person point of view (POV) 220 when an anti-peek system is disabled, according to certain aspects of the present disclosure. As illustrated, an opponent 202 and a player 204 are positioned proximate to a barrier 210. It may be determined that a line of sight (e.g., line of sight 110) intersects the barrier 210.

For example, as illustrated in FIG. 2A, no portion of opponent 202 (e.g., character model) is visible from the first-person POV, and so the opponent is not within the line of sight. Therefore, if the player 204 causes the camera to switch from a first-person POV to a third-person POV (e.g., through executing/performing the emote 206), the opponent 202 should not be rendered to maintain fairness and competitive integrity. However, because the anti-peek feature is turned off (e.g., disabled), the opponent is rendered, causing an unfair advantage for the player 204.

Figure 2C:
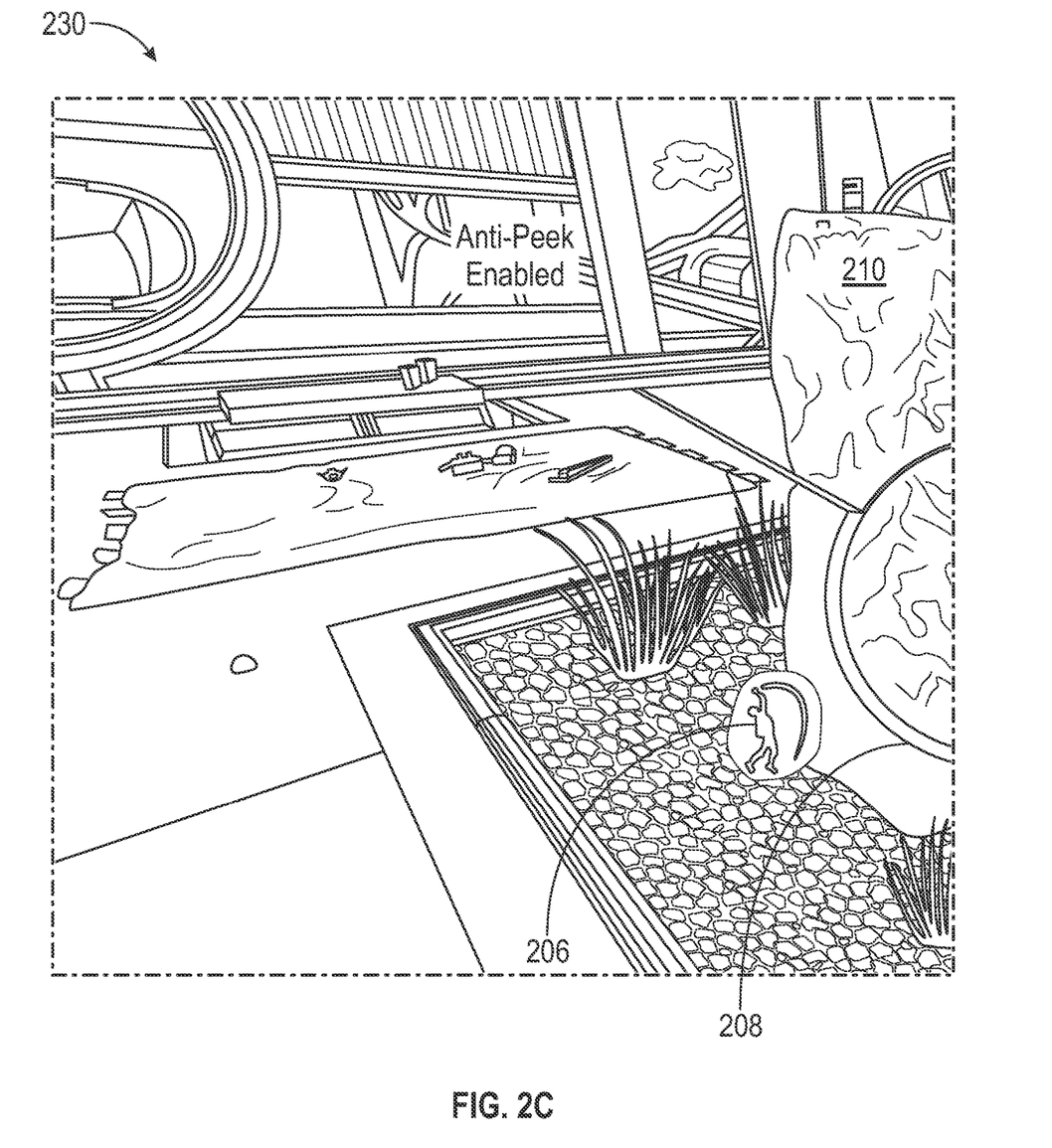
FIG. 2C illustrates an exemplary first-person point of view (POV) when an anti-peek system is enabled, according to certain aspects of the present disclosure.

FIG. 2C illustrates an exemplary first-person point of view (POV) 230 when an anti-peek system is enabled, according to certain aspects of the present disclosure. As illustrated, from the first-person POV, the barrier 210 obstructs the player's view of what is behind the barrier 210. The player may choose to perform the emote 206 (e.g., the uppercut gesture, or otherwise), which may be selected from the in-game menu 208. As will be illustrated below in FIG. 2D, the POV changes from first-person to third-person when the player performs the emote 206.

Figure 2D:
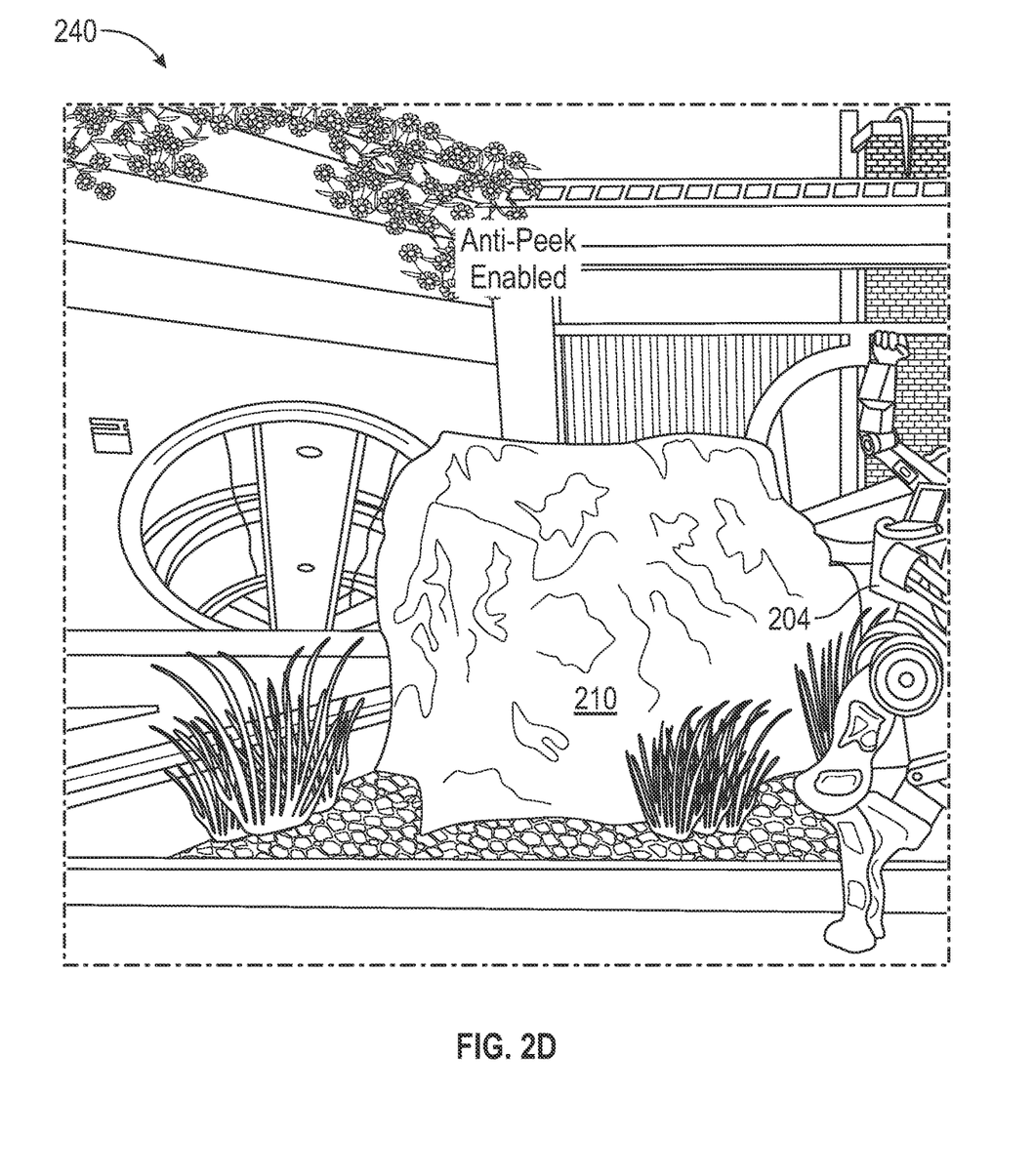
FIG. 2D illustrates an exemplary third-person point of view (POV) when an anti-peek system is enabled, according to certain aspects of the present disclosure.

FIG. 2D illustrates an exemplary third-person point of view (POV) 240 when an anti-peek system is enabled, according to certain aspects of the present disclosure. As discussed above, it may be determined whether a line of sight (e.g., line of sight 110) intersects the barrier 210. For example, as illustrated in FIG. 2C, the barrier 210 obstructs the player's view of what is behind the barrier 210, and so opponents (if there are any) would not be within the line of sight. Therefore, if the player 204 causes the camera to switch from a first-person POV to a third-person POV (e.g., through executing/performing the emote 206), the opponent 202 should not be rendered. Therefore, because the anti-peek feature is turned on (e.g., enabled), the opponent (if there is one) is not rendered. In this way, a potential unfair advantage to the player 204 is prevented/eliminated, which improves competition and enjoyment of the video game.

Figure 3:
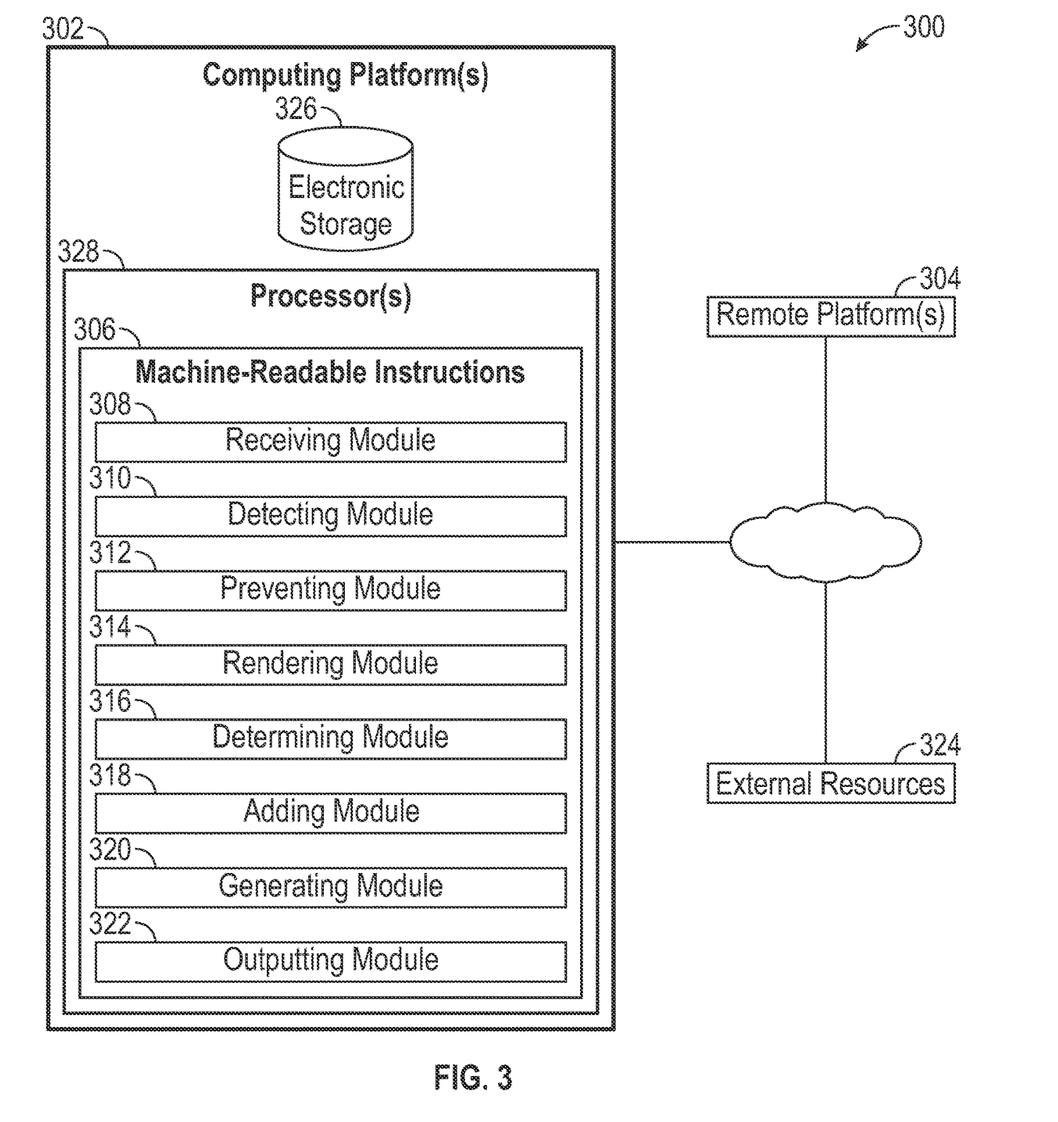
FIG. 3 illustrates a system configured for preventing rendering of a video game opponent, in accordance with one or more implementations.

FIG. 3 illustrates a system 300 configured for preventing rendering of a video game opponent, in accordance with one or more implementations of an anti-peek feature. In some implementations, system 300 may include one or more computing platforms 302. Computing platform(s) 302 may be configured to communicate with one or more remote platforms 304 according to a client/server architecture, a peer-to-peer architecture, and/or other architectures.

In some embodiments, remote platform(s) 304 may be configured to communicate with other remote platforms via computing platform(s) 302 and/or according to a client/server architecture, a peer-to-peer architecture, and/or other architectures. In some embodiments, remote platform(s) 304 and computing platform(s) 302 can be similar computing devices, such exemplary hardware and/or software of illustrated with reference to 302 (e.g., storage 326, processor 328, instructions 306, etc.) can also or alternatively be included the remote platform(s) 304. In some embodiments, the computing platform(s) 302 and/or remote platforms 304 can be a game client and/or game server in a client/server architecture, in which the server enables one or more player client devices to play or participate in a video game that includes anti-peek features.

Computing platform(s) 302 may include and be configured to execute machine-readable instructions 306. In some embodiments, machine-readable instructions 306 include software comprising and/or composing a video game, or portion thereof, among other things. As such, machine-readable instructions 306 may include one or more instruction modules to facilitate gameplay, including an anti-peek feature, among other things.

In some embodiments, the instructions 306 include one or more computer program modules, such as a receiving module 308, detecting module 310, preventing module 312, rendering module 314, determining module 316, adding module 318, generating module 320, and/or outputting module 322, and/or other instruction modules.

Receiving module 308 may be configured to receive an action causing a first character (e.g., a player-controlled character by a first player) to be rendered or displayed in a third-person point of view (POV), as opposed to their traditional display in a first-person POV.

Detecting module 310 may be configured to detect that the received action causes the first person POV, or camera perspective, of one or more players or characters of the video game to be changed to a third-person POV.

Preventing module 312 may be configured to prevent rendering of another character (e.g., another player-controlled character by a second player, where the second player may be an opponent of the first player), object, environment, etc., when that character, object, or environment is is outside a visibility range or line of sigh, corresponding to the first-person POV of the character associated with a player (e.g., character eye).

Rendering module 314 may be configured to render the objects and characters in the first-person POV video game that are within a first-person field of view (FOV) of the main character controlled by the first player.

Determining module 316 may be configured to determine that the opponent is not visible within a first-person field of view (FOV) of the main character. The determining module 316 may also be configured to determine that the opponent will be visible within a third-person FOV of the main character when the POV changes from the first-person POV to the third-person POV.

Adding module 318 may be configured to add the opponent to a list for evaluation of whether the opponent will be visible from the first-person POV of the main character.

In some embodiments, generation or casting of multiple traces (or "rays" or "raycasts") among the field of view of a character (e.g., from or among the character eye of the player's character) is performed. These traces can be used to identify if any portions (e.g., body parts) of one or more opponent characters are within the line of sight of the player's character. As such, when a trace does not intersect or collide with any portion of one or more opponent character, the preventing module 312 can determine that a nearby opponent character is outside the FOV or line of sight of a player's character. In some embodiments, the casting of traces or rays can be implemented as a separate module.

In turn, the preventing module 312 or other module among machine-readable instructions 306, can instruct or provide instructions for a renderer or rendering pipeline to omit or prevent the rending of an opponent character, object, environment, and the like.

Therefore, in some embodiments, the opponent is rendered if any body part of the opponent (and/or part/portion of an object, environment, and the like) is visible within a first-person field of view (FOV) of the player's character, and not rendered otherwise. In some embodiments, the preventing modules 312 can indicate which specific portions of body parts of a character (and/or part/portion of an object, environment, and the like) should be rendered and which should not be rendered, so as to not render the entire opponent character upon the detection of any body part (and/or part/portion of an object, environment, and the like).

In turn, the preventing module 312 helps maintain fairness and competitive integrity by identifying that an opponent character is outside the FOV of a player's character and should not be rendered to display when the camera view changes from first-person to third-person view. However, if the opponent character moves within the FOV of a player's character, the opponent character can be rendered thereafter for the duration of the action and/or for the duration that the opponent character remains in the FOV of the player's character (e.g., within the duration of the action causing the perspective change).

In some embodiments, preventing module 312 does not account and monitor for game objects or indicators of an opponent character's presence. For example, such indications can include at least one of a shadow, a trap, a portal, a surveillance drone, or other in-game objects, overlays, notifications, or prompts of the like. In some embodiments, preventing module 312 can be configured to account and monitor for game objects or indicators of an opponent character's presence.

In some embodiments, machine-readable instructions 306 can include video game client components (e.g., a game engine, gameplay systems, and game assets) that provide the underlying frameworks and software that support and facilitate features of the video game, such as virtual interactive environments and curiosity agents.

In some embodiments, a game engine is an underlying software framework that runs a video game. A game engine includes, among other things, a renderer, simulator, and stream layer. A renderer is a graphics framework that manages the production of graphics. As used herein in some embodiments, a simulator refers to a framework that manages simulation aspects corresponding to physics and other corresponding mechanics used in part for animations and/or interactions of gameplay objects, entities, characters, lighting, gases, and other game assets or effects of the like. A stream layer is a software layer that allows a renderer and simulator to run independently of each other by providing a common execution stream for graphics and animations to be produced at runtime. In some embodiments a game engine includes an audio engine that synchronizes audio playback with the common execution of a stream layer, or with the simulator directly.

Gameplay systems can be used in conjunction with a game engine to facilitate and manage gameplay logic and other features of a video game. As such, gameplay systems can be software components or modules that can support the game engine, among other things. For example, gameplay systems can include Software Development Kits (SDKs), Application Program Interfaces (APIs), and software libraries such as shims and/or Dynamically Linked Libraries (DLLs) that enable a variety of functionality such as providing additional graphics, audio, or communication support, establishing and maintaining service connections, performing authorizations, and providing anti-cheat and anti-fraud detection, among other things.

In some embodiments, a game engine and/or gameplay systems can reference game assets to produce a gameplay session. Game assets are digital assets that correspond to or can be used to create the virtual interactive environments for gameplay (a gameplay session), as well as menus and notifications, and other things of the like. In some embodiments, game assets can include game objects, textures, terrain maps, geometry scripts, animation files, audio files, character models, video files, font libraries, visual effects, and other digital assets of video games of the like.

As such, machine-readable instructions 306 can utilize video game client components, among other components and modules, to cause the video game to be rendered to display, in conjunction with receiving module 308, detecting module 310 and preventing module 312 to enable an anti-feature feature. In some embodiments, one or more of modules 308, 310, and/or 312 can be included among or communicatively coupled to a rendering pipeline, or graphics pipeline, within a renderer and/or game engine, as known to one skilled in the art.

Therefore, in some embodiments, the anti-peek feature can affect, modify, or otherwise cause changes to a rendering pipeline, or the instructions thereof. As such, the rendering pipeline of a player associated with a character invoking the anti-peek feature (as aforementioned) can be instructed to prevent rendering or be withheld instructions from rendering an opponent when the anti-peek feature is enabled.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (e.g., substantially non-removable) with computing platform(s) 302 and/or removable storage that is removably connectable to computing platform(s) 302 via, for example, a port (e.g., a USB port, a firewire port, among other things of the like) or a drive (e.g., a disk drive, among other things of the like). Electronic storage 326 may include one or more of optically readable storage media (e.g., optical disks, among other things of the like), magnetically readable storage media (e.g., magnetic tape, magnetic hard drive, floppy drive, among other things of the like), electrical charge-based storage media (e.g., EEPROM, RAM, among other things of the like), solid-state storage media (e.g., flash drive, among other things of the like), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software, hardware, firmware, some combination of software, hardware, and/or firmware, and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
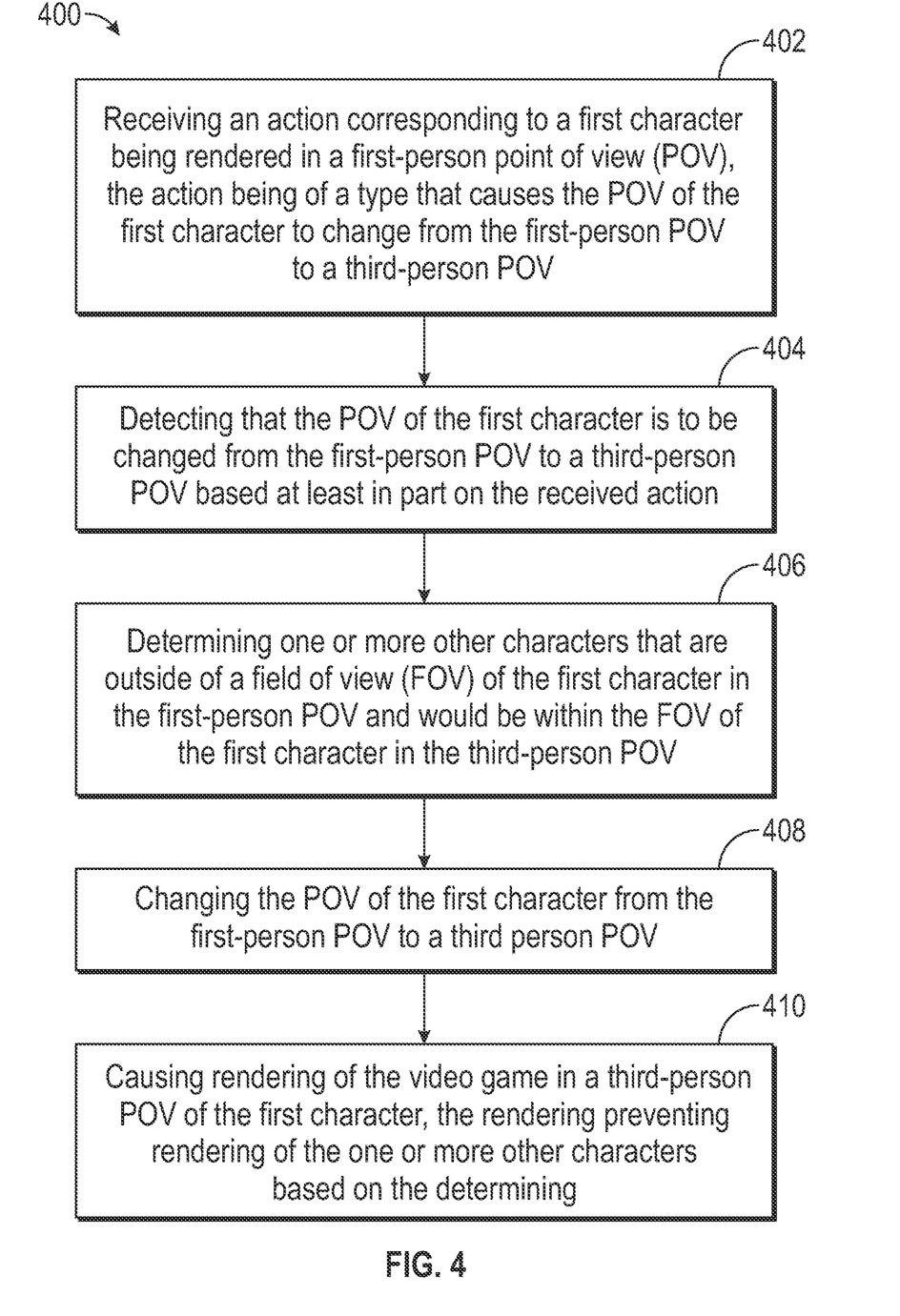
FIG. 4 illustrates an example flow diagram for preventing rendering of a video game opponent, according to certain aspects of the present disclosure.

FIG. 4 illustrates an example flow diagram (e.g., process 400) to prevent rendering of a video game character in a video game, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, an action is received corresponding to a first character being rendered in a first-person point of view (POV). For example, the action can be of a type that causes the POV of the first character to change from the first-person POV to a third-person POV.

At step 404, it is detected that the POV of the first character is to be changed from the first-person POV to a third-person POV based at least in part on the received action.

At step 406, one or more other characters are determined to be outside of a field of view (FOV) of the first character in the first-person POV and would be within the FOV of the first character in the third-person POV.

At step 408, the POV of the first character is changed from the first-person POV to a third person POV.

At step 410, the video game is caused to be rendered in a third-person POV of the first character. For example, the rendering may preventing rendering of the one or more other characters based on the determining.

For example, as described above in relation to FIGS. 1-3, at step 402, an action (e.g., an emote 206) is received corresponding to a first character being rendered in a first-person point of view (POV). For example, the action can be of a type that causes the POV of the first character to change from the first-person POV to a third-person POV (e.g., as illustrated in FIGS. 2A and 2C). At step 404, it is detected (e.g., via detecting module 310) that the POV of the first character is to be changed from the first-person POV to a third-person POV based at least in part on the received action. At step 406, one or more other characters (e.g., opponent 102, 202) are determined to be outside of a field of view (FOV) of the first character in the first-person POV and would be within the FOV of the first character in the third-person POV. At step 408, the POV of the first character is changed from the first-person POV to a third person POV. At step 410, the video game is caused to be rendered in a third-person POV of the first character. For example, the rendering may prevent rendering of the one or more other characters based on the determining.

According to an aspect, the determining that the one or more other characters are outside the FOV of the first character in the first-person POV and would be within the FOV of the first character in the third-person POV further includes casting a set of trace among the FOV of the first character in the first-person POV. The process 400 can further include identifying the one or more other characters with which the set of traces cast do not collide.

According to an aspect, the first character is controlled by a first player via a first computing device, and the one or more other characters are controlled by one or more other players via one or more other computing devices.

According to an aspect, the FOV of the first character includes a range from zero degrees to 180 degrees.

According to an aspect, the action includes at least one of an emote or an act of a second player that is different from a first player.

According to an aspect, the one or more other characters are no longer prevented from being rendered when any portion of the one or more other characters collide with a trace from among the set of traces cast.

According to an aspect, indications related to the one or more other characters are not rendered.

According to an aspect, the action causes the POV of two or more characters to change from the first person POV to the third-person POV.

According to an aspect, the process 400 further includes rendering the objects and characters in the first-person POV video game that are within a first-person field of view (FOV) of the main character controlled by the first player.

According to an aspect, the process 400 further includes determining that the opponent is not visible within a first-person field of view (FOV) of the main character.

According to an aspect, the process 400 further includes determining that the opponent will be visible within a third-person FOV of the main character when the POV changes from the first-person POV to the third-person POV.

According to an aspect, the opponent is controlled by a second player that is different from the first player.

According to an aspect, a first-person field of view (FOV) of the main character may include a range of 90 to 100 degrees (e.g., 180 degrees or less).

According to an aspect, the action may include at least an emote, gesture, dance, or otherwise. The action may also include an act of a second player that is different from the first player. According to aspects, the act (e.g., action) of a second player may cause a first player to enter a third person perspective view. Some examples where the actions or interactions of/with a second player cause a first player to enter a third person perspective view include instances when a first player is knocked down and is revived directly by a teammate (e.g., both players go into a third person view), when a first player is knocked down and is revived indirectly by teammate (e.g., the reviving first player goes into a third person view), and when a first player is knocked down and an enemy player performs a finisher. In an aspect, a finishing elimination move may cause the knocked down player to be eliminated from gameplay, and both players may go into a third person view (e.g., the inverse of this situation applies as well).

According to an aspect, the opponent is rendered if any body part of the opponent is visible within a first-person field of view (FOV) of the main character.

According to an aspect, the process 400 further includes adding the opponent to a list for evaluation of whether the opponent will be visible from the first-person POV of the main character.

According to an aspect, the process 400 further includes generating multiple traces from a field of view (FOV) of the main character to different body parts of the opponent to determine whether the opponent is visible to the main character.

According to an aspect, indications related to the opponent are not rendered. For example, the indications may include at least one of a shadow, a trap, a portal, a surveillance drone, among other things of the like.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
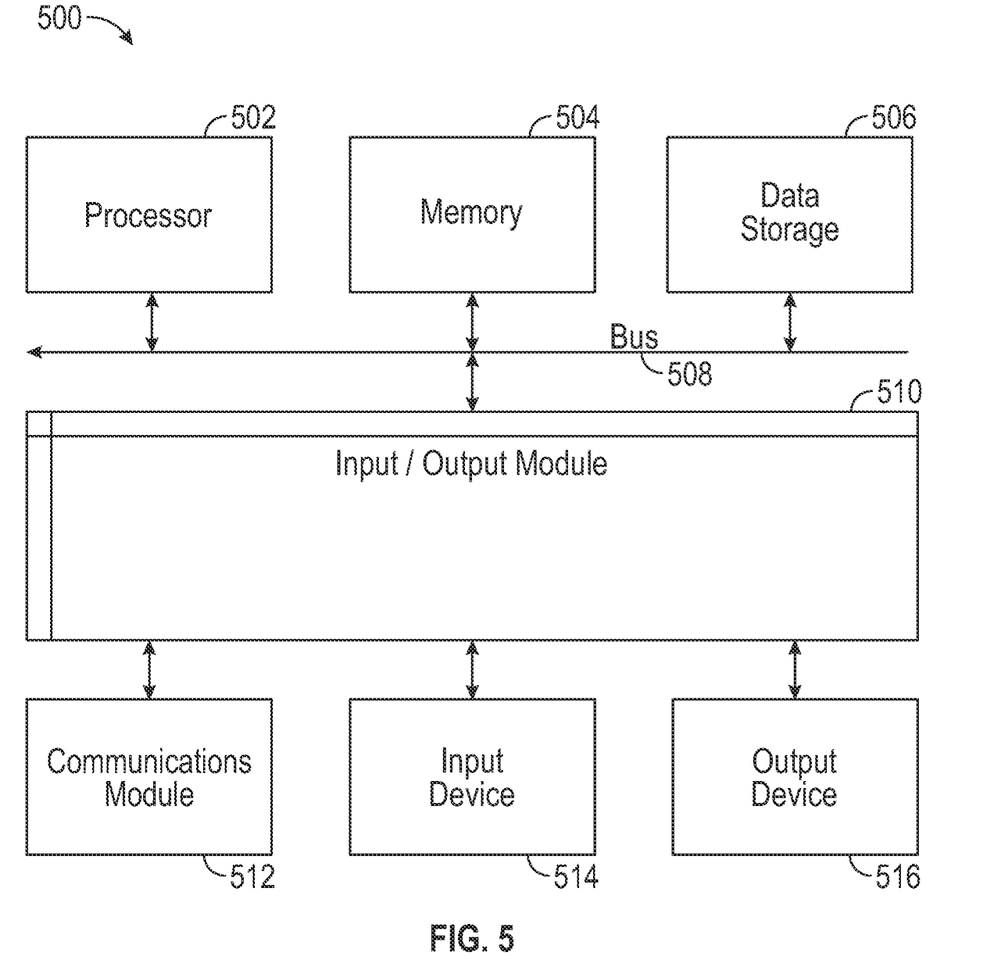
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network, the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method to prevent rendering of a game asset in a video game, comprising:
   detecting that the point of view (POV) of a first character is to be changed from the first-person POV to a third-person POV based at least in part on a received action;
   determining one or more game assets that are outside of a field of view (FOV) of the first character in the first-person POV and would be within the FOV of the first character in the third-person POV;
   changing the POV of the first character from the first-person POV to the third-person POV; and
   causing rendering of the video game in the third-person POV of the first character, the rendering being configured to prevent rendering of the one or more game assets based on the determining.

2. The computer-implemented method of claim 1, wherein the received action is an action of the first character.

3. The computer-implemented method of claim 1, wherein the received action is an action of a second character.

4. The computer-implemented method of claim 1, wherein the game assets include one or more of: game objects, player characters, and non-player characters.

5. The computer-implemented method of claim 1, wherein the POV of the first character is changed from the first-person POV to the third-person POV for the duration of the received action.

6. The computer-implemented method of claim 1, wherein the determining the one or more game assets that are outside the FOV of the first character in the first-person POV and would be within the FOV of the first character in the third-person POV comprises:
   casting a set of traces among the FOV of the first character in the first-person POV; and
   identifying the one or more game assets with which the set of traces cast do not collide.

7. The computer-implemented method of claim 6, wherein the one or more game assets are not prevented from being rendered in response to any portion of the one or more game assets colliding with a trace from among the set of traces cast.

8. A system, comprising:
   one or more processors; and
   one or more memory devices communicatively coupled to one or more processors, the one or memory devices storing computer-executable instructions that, when executed by the one or more processors, cause the one or more processors to:
   detect that the point of view (POV) of a first character is to be changed from the first-person POV to a third-person POV based at least in part on a received action;
   determine one or more game assets that are outside of a field of view (FOV) of the first character in the first-person POV and would be within the FOV of the first character in the third-person POV;
   change the POV of the first character from the first-person POV to the third-person POV; and
   cause rendering of the video game in the third-person POV of the first character, the rendering being configured to prevent rendering of the one or more game assets based on the determining.

9. The system of claim 8, wherein the received action is an action of the first character.

10. The system of claim 8, wherein the received action is an action of a second character.

11. The system of claim 8, wherein the game assets include one or more of: game objects, player characters, and non-player characters.

12. The system of claim 8, wherein the POV of the first character is changed from the first-person POV to the third-person POV for the duration of the received action.

13. The system of claim 8, wherein the determining the one or more game assets that are outside the FOV of the first character in the first-person POV and would be within the FOV of the first character in the third-person POV comprises:
   casting a set of traces among the FOV of the first character in the first-person POV; and
   identifying the one or more game assets with which the set of traces cast do not collide.

14. The system of claim 13, wherein the one or more game assets are not prevented from being rendered in response to any portion of the one or more game assets colliding with a trace from among the set of traces cast.

15. A non-transitory computer readable medium storing instructions that, when executed by one or more processors, causes the one or more processors to perform a method comprising:
   detecting that the point of view (POV) of a first character is to be changed from the first-person POV to a third-person POV based at least in part on a received action;
   determining one or more game assets that are outside of a field of view (FOV) of the first character in the first-person POV and would be within the FOV of the first character in the third-person POV;
   changing the POV of the first character from the first-person POV to the third-person POV; and
   causing rendering of the video game in the third-person POV of the first character, the rendering being configured to prevent rendering of the one or more game assets based on the determining.

16. The non-transitory computer-readable medium of claim 15, wherein the received action is an action of the first character.

17. The non-transitory computer-readable medium of claim 15, wherein the received action is an action of a second character.

18. The non-transitory computer-readable medium of claim 15, wherein the game assets include one or more of: game objects, player characters, and non-player characters.

19. The non-transitory computer-readable medium of claim 15, wherein the POV of the first character is changed from the first-person POV to the third-person POV for the duration of the received action.

20. The non-transitory computer-readable medium of claim 15, wherein the determining the one or more game assets that are outside the FOV of the first character in the first-person POV and would be within the FOV of the first character in the third-person POV comprises:
   casting a set of traces among the FOV of the first character in the first-person POV; and
   identifying the one or more game assets with which the set of traces cast do not collide.

* * * * *